United States Patent
Wang et al.

(10) Patent No.: US 8,527,534 B2
(45) Date of Patent: Sep. 3, 2013

(54) BOOTSTRAP AND ADAPT A DOCUMENT SEARCH ENGINE

(75) Inventors: Kuansan Wang, Bellevue, WA (US); Bo-June Hsu, Woodinville, WA (US); Xiaolong Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 12/726,358

(22) Filed: Mar. 18, 2010

(65) Prior Publication Data
US 2011/0231394 A1 Sep. 22, 2011

(51) Int. Cl.
*G06F 17/30* (2006.01)

(52) U.S. Cl.
USPC .......................................... 707/769; 707/748

(58) Field of Classification Search
USPC ................................................ 707/769, 748
See application file for complete search history.

(56) References Cited

U.S. PATENT DOCUMENTS

| | | | |
|---|---|---|---|
| 6,081,779 A | 6/2000 | Besling et al. | |
| 6,418,431 B1 | 7/2002 | Mahajan et al. | |
| 7,254,529 B2 | 8/2007 | Gao et al. | |
| 7,478,038 B2 | 1/2009 | Chelba et al. | |
| 7,580,926 B2 | 8/2009 | Kapur et al. | |
| 2006/0212288 A1 | 9/2006 | Sethy et al. | |
| 2007/0078822 A1* | 4/2007 | Cucerzan et al. | 707/3 |
| 2008/0201131 A1* | 8/2008 | Kar et al. | 704/9 |
| 2009/0234878 A1 | 9/2009 | Herz et al. | |
| 2011/0172988 A1 | 7/2011 | Wang et al. | |

OTHER PUBLICATIONS

Lecorv'e, et al. , "An Unsupervised Web-Based Topic Language Model Adaptation Method ", Retrieved at <<http://www.irisa.fr/metiss/guig/biblio/08/lecrove-icassp-08.pdf>>, 2008 IEEE.

Chen, Berlin, "Dynamic Language Model Adaptation Using Latent Topical Information and Automatic Transcripts ", Retrieved at <<http://ieeexplore.ieee.org//stamp/stamp.jsp?tp=&arnumber=01521369>>, 2005 IEEE.

Trnka, Keith, "Adaptive Language Modeling for Word Prediction ", Retrieved at <<http://www.aclweb.org/anthology/P/P08/P08-3011.pdf>>, Proceedings of the ACL-08: HLT Student Research Workshop (Companion Volume), Columbus, Jun. 2008.

Tam, et al. , "Unsupervised Language Model Adaptation Using Latent Semantic Marginals ", Retrieved at <<http://www.google.co.uk/url?sa=t&source=web&ct=res&cd=1&ved=0CAwQFjAA&url=http%3A%2F%2Fwww.cs.cmu.edu%2F~yct%2Fpapers%2Fis06.ps&rct=j&q=Unsupervised+Language+Model+Adaptation+Using+Latent+Semantic+Marginals&ei=OoVNS-ryNoLw0gTu5bT-DQ&usg=AFQjCNFS1cw1oF5MrujMZOrUnCpKYp6JEQ>>, Jan. 15, 2010.

(Continued)

*Primary Examiner* — Rehana Perveen
*Assistant Examiner* — Alexander Khong

(57) ABSTRACT

Architecture that employs a modeling technique based on language modeling to estimate a probability of a document matching the user need as expressed in the query. The modeling technique is based on the data mining results that various portions of a document (e.g., body, title, URL, anchor text, user queries) use different styles of human languages. Thus, the results based on a language can be adapted individually to match the language of query. Since the approach is based on adaptation, the framework also provides a natural means to progressively revise the model as user data are collected. Different styles of languages in a document can be recognized and adapted individually. Background language models are also employed that offer a fallback approach in case the document has incomplete fields of data, and can utilize topical or semantic hierarchy of the knowledge domain.

20 Claims, 7 Drawing Sheets

(56) References Cited

OTHER PUBLICATIONS

Seymore, et al., "Using Story Topics for Language Model Adaptation", Retrieved at <<http://www.cs.cmu.edu/~roni/papers/story-topic-eurospeech-97.pdf>>, Jan. 15, 2010.
Brants, et al., "Large Language Models in Machine Translation", Proceedings of the 2007 Joint Conference on Empirical Methods in Natural Language Processing and Computational Natural Language Learning, Jun. 2007, pp. 858-867.
"N-gram", Retrieved at <<http://en.wikipedia.org/wiki/N-gram>>, last modified Oct. 5, 2009, 5 pages.
Franz, et al., "All Our N-gram are Belong to You", Retrieved at <<http://googleresearch.blogspot.com/2006/08/all-our-n-gram-are-belong-to-you.html>>, Aug. 3, 2006, 5 pages.
Carlson, et al., "Memory-Based Context-Sensitive Spelling Correction at Web Scale", Proceedings of the Sixth International Conference on Machine Learning and Applications, Dec. 13-15, 2007, 6 pages.
Rosenfeld, R., "Adaptive Statistical Language Modeling: A Maximum Entropy Approach", Retrieved at <<http://www.cs.cmu.edu/~roni/papers/me-thesis-TR-94-138.pdf>>, Apr. 19, 1994, 114 pages.
Masataki, et al., "Task Adaptation Using Map Estimation in N-Gram Language Modeling", 1997 IEEE International Conference on Acoustics, Speech, and Signal Processing (ICASSP'97), Apr. 21-24, 1997, pp. 783-786.
Bacchiani, et al., "Language model adaptation with MAP estimation and the perceptron algorithm", Human Language Technology Conference-North American Cancer of the Association for Computational Linguistics Annual Meeting (HLT-NAACL), 2004, pp. 21-24.
Shannon, C. E., "A Mathematical Theory of Communication", The Bell System Technical Journal, vol. 27, Jul. Oct. 1948, pp. 379-423 and 623-656.
Rosenfeld, Ronald, "Two Decades of Statistical Language Modeling: Where Do We Go From Here?", Proceedings of the IEEE, Aug. 2000, vol. 88, Issue 8, 9 pages.
Clarkson, et al., "Statistical Language Modeling Using the CMU-Cambridge Toolkit", Eurospeech 1997, dated 1997, 4 pages, Rhodes, Greece.
Hsu, et al., "Iterative Language Model Estimation: Efficient Data Structure and Algorithms", Proc. of 9th Annual Conference of the International Speech Communication Association (Interspeech 2008), Sep. 22-26, 2008, 4 pages, Brisbane, Australia.
Stolcke, A., "SRILM—An Extensible Language Modeling Toolkit", 7th International Conference on Spoken Language Processing (ICSLP 2002), Sep. 16-20, 2002, 4 pages.
Chen, et al., "An Empirical Study of Smoothing Techniques for Language Modeling", Proceedings of the 34th annual meeting on Association for Computational Linguistics, Aug. 1998, pp. 1-63.
Nguyen, et al., "MSRLM: A Scalable Language Modeling Toolkit", Technical Report MSR-TR-2007-144, Nov. 2007, 19 pages.
Wang, K., "Semantic Synchronous Understanding for Robust Spoken Language Applications", IEEE Workshop on Automatic Speech Recognition and Understanding, 2003. ASRU '03, Nov. 30-Dec. 3, 2003, pp. 640-645.
Bellegarda, J., "Statistical Language Model Adaptation: Review and Perspective", Speech Communication, vol. 42, No. 1, Jan. 2004, pp. 93-108.
Suzuki, et al., "A Comparative Study on Language Model Adaptation Techniques Using New Evaluation Metrics", Proceedings of the conference on Human Language Technology and Empirical Methods in Natural Language Processing, Oct. 6-8, 2005, pp. 265-272.
Tur, et al., "Unsupervised Language Model Adaptation for Meeting Recognition", IEEE International Conference on Acoustics, Speech and Signal Processing, 2007 (ICASSP 2007), vol. 4, Apr. 15-20, 2007, 4 pages.
Liu, et al., "Context Dependent Language Model Adaptation", Proc. of 9th Annual Conference of the International Speech Communication Association (Interspeech 2008), Sep. 22-26, 2008, 4 pages, Brisbane, Australia.
Goodman, et al., "Language Model Size Reduction by Pruning and Clustering", Sixth International Conference on Spoken Language Processing (ICSLP 2000), Oct. 16-20, 2000, pp. 5, Beijing, China.
Bulyko, et al., "Web Resources for Language Modeling in Conversational Speech Recognition", ACM Transactions on Speech and Language Processing, vol. 5, Issue 1, Dec. 2007, 25 pages.

\* cited by examiner

BOOTSTRAP AND ADAPT A DOCUMENT SEARCH ENGINE

BACKGROUND

The retrieval accuracy of a search engine can be greatly improved when the engine is constantly updated with cues harvested from the usage data. However, the quality of the usage data is highly dependent upon the search engine that is used to collect such data. Therefore it is desired to have a "bootstrap" engine with reasonable quality when venturing into a new domain.

A typical approach to ensure good bootstrap quality is to train the engine with exemplars. The exemplars oftentimes have to be collected and labeled by humans, a process that is time consuming and expensive especially when a large quantity is oftentimes necessary to have a well trained engine. The exemplars can become stale, especially for domains on the web where hot trends and new contents emerge with rapid pace.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The architecture includes a modeling technique based on language modeling techniques to estimate a probability of a document matching the user need as expressed in the query. The modeling technique is based on the data mining results that various portions of a document (e.g., body, title, URL, anchor text, user queries) use different styles of human languages. Thus, the results based on a language can be adapted individually to match the language of query. Since the approach is based on adaptation, the framework also provides a natural means to progressively revise the model as user data are collected.

The architecture employs an adaptation approach for a language model, rather than the machine learning methods that attempt to generalize from exemplars to cover unseen cases. Additionally, different styles of languages in a document can be recognized and adapted individually. Background language models are also employed that offer a graceful fallback approach in case the document has incomplete fields of data, and can utilize topical or semantic hierarchy of the knowledge domain.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
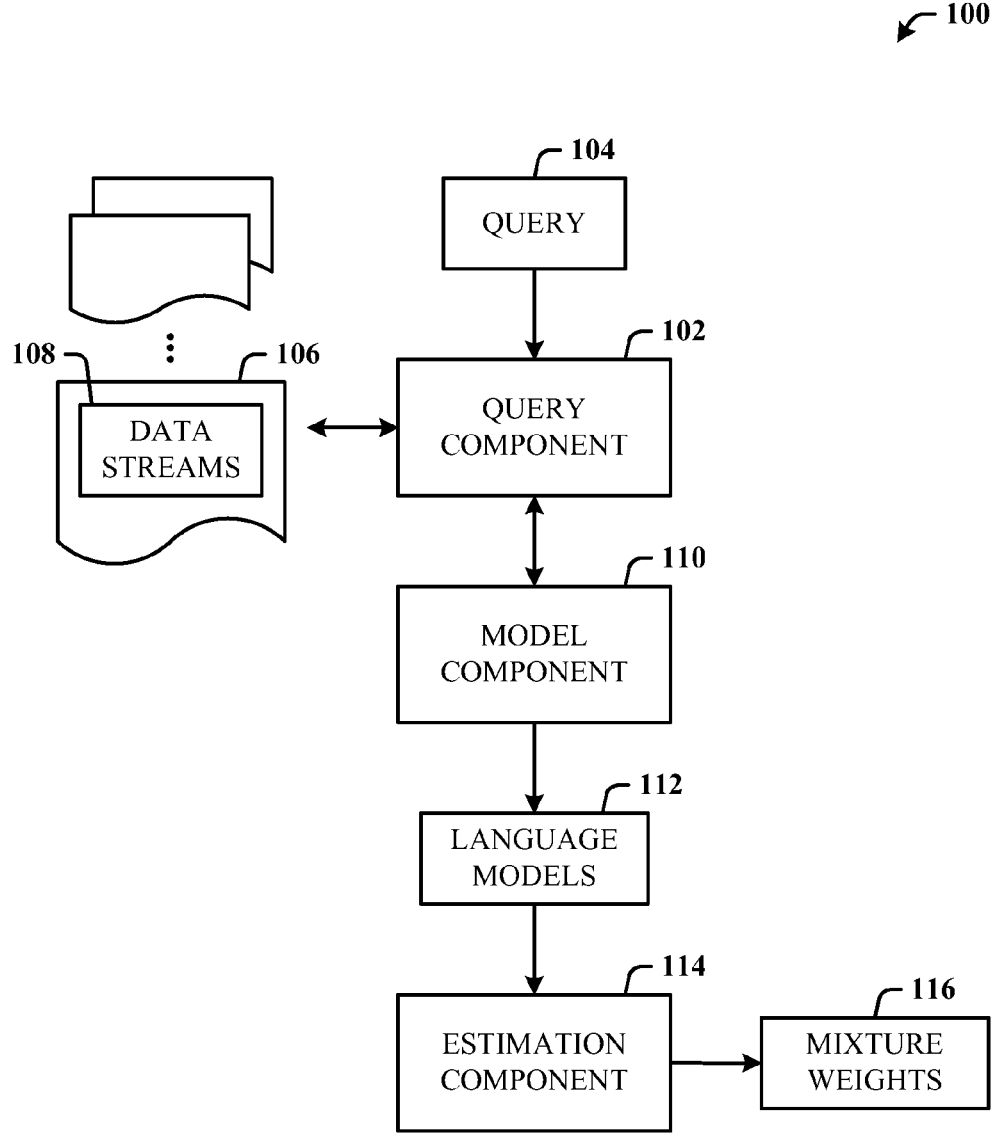
FIG. 1 illustrates a computer-implemented information retrieval system in accordance with the disclosed architecture.

The disclosed architecture is a language modeling approach to document retrieval in which each document is characterized by a mixture model with components that correspond to the various streams (multimedia, metadata) associated with the document. However, issues for such a mixture model approach arise as all the same streams are not always present for the multiple documents, and do not share the same lexicon, thereby complicating the ability to properly combine the statistics from the mixture components. As a solution, an "open-vocabulary" smoothing technique is disclosed so that all the component language models of a document and across documents have the same cardinality, and hence, the scores can simply be linearly combined.

Documents can be crawled from document sources such as from the Internet, enterprise datastores, and/or client machines, for example. For each retrieval unit (document), identification is made of the associated multi-media descriptions for that retrieval unit. Generally, a retrieval unit can be anything to which a uniform resource identifier (URI) is assigned. Although the description below uses web documents as retrieval units, it is to be appreciated that the disclosed architecture can be generalized to resources other than documents, as well. The term multi-media description or streams is intended to encompass text streams, audio streams, video stream, image streams, etc. For example, when dealing with audio books, speech recognition can be performed. If a radio clip of an audio channel, there can be closed captioning information as well as the audio track information for speech recognition. Image analysis can be performed for images, and frames of video streams.

Thus, analysis is performed for each retrieval unit to gather all of the associated descriptions and then identify the different descriptions styles. For example, in the case of the retrieval unit being a web documents, anchor text can be analyzed, and how users refer to this document. Anchor text is often composed in a different linguistic style than the document title or document body.

For an enterprise search, for example, there can be metadata for each retrieval unit that is automatically generated by the client application or server application. The application can tag the author if generated from an email thread, as well as provide email thread identifiers, etc. Thus, there is set of rich metadata that can be associated with a document even though not literally inside the document. Spreadsheet programs may provide even more metadata.

Based on the many streams of data that can be obtained from a document, and the metadata associated with the document, the language models can be developed. Each stream has one or more characteristics. A model is developed for each characteristic. For example, for a web document, there can be developed a language model for the document body, a language model for the title, and a language model for the anchor text and yet another language model for the query.

When performing searches on the Internet or other similar networks, each document is oftentimes associated with the web search engine that users utilize to retrieve the document. Thus, another source of stream is a query stream. Using all the developed models, linear interpolation can be performed on the adaptive framework. Contrariwise, in conventional systems, users are asked to submit queries, a list of retrieval candidates is presented and "judges" label candidates deemed relevant. The label data is used as a training set to train the parameters for the mixture model.

The disclosed architecture obviates this manual process and introduces an automated judging process that estimates the probability of a document matching the user need as expressed in the query. The modeling technique is based on the data mining results that various portions of a document (e.g. body, title, URI, and anchor text that others use to refer to these documents) use different style of human languages and therefore can be adapted individually to match the language of query. Since this approach is based on adaptation, the framework also provides a natural means to progressively revise the model as user data are collected.

Although described in the context of web documents, it is to be understood that the disclosed solution can be applied to other documents as well, such as documents stored in enterprise systems, and associated with client-based applications.

A straightforward generalization for a language model is to view the document as being described by multiple text streams. A quantitative analysis on the documents indexed by a commercial web search engine indicates that all these text streams seem to be written in respective language styles and have varying degrees of mismatch with the query. This provides motivation to model the associated linguistic characteristics separately. Empirical studies on applying the language models for different task domains indicate that mixing textual sources with different language styles can significantly degrade the quality of language models.

When a probability space is divided into disjoint partitions, the probability P of an event can be evaluated as the sum of the conditional probability of the event occurring in each partition, weighted by the prior of that partition. Applying this principle to the document modeling, let document $D_i$ denote the $i^{th}$ stream of D and $P_{D_i}$ and $w_{D_i}$ is the document weight, the corresponding multi-mixture component language model for the stream can be the following:

$$P_D = \sum_i P(D_i | D) P_{D_i} = \sum_i w_{D_i} P_{D_i} \quad (1)$$

Beneath the linear interpolation form of (1) are questions related to the conditions under which the component language models can be combined properly. Since the foundation of mixture modeling is derived from the probability space partitioning, all the mixture components can be modeling the same underlying probability space. It is known that language models having different sets of vocabulary should be viewed as modeling different domains. Unfortunately, as a consequence, the associated scores cannot be directly compared, let alone combined into a mixture distribution. Although the description uses the linear interpolation, or the "sum of products form" of (1) as the basis for embodiments, it is to be understood that the component language models can be combined in the logarithmically linear (log-linear) fashion or in the form of "product of sums".

When applying language models for information retrieval (IR), for example, it is necessary to ensure that all document language models have the same vocabulary so that the document language models do not selectively treat different portions of the query as out-of-vocabulary (OOV) terms. A common approach to smooth the document language models with a shared background model effectively makes all documents use the same vocabulary of the background model, yet OOVs are common. For IR using mixture language models, OOVs of one mixture component are not necessarily the OOVs for others, thereby making the task of properly computing the combined probability of the query a difficult proposition.

The disclosed architecture addresses this problem by employing an "open-vocabulary" language model approach. At the core of the open-vocabulary language model is a formidable challenge to assess the probability mass for OOVs. Language models that can yield non-trivial probabilities for OOVs can be viewed as modeling a language with infinite vocabulary. All open-vocabulary language models thus at least have the same cardinality for associated vocabulary, and the probabilistic scores are on a more solid ground to be comparable and combined.

The architecture includes an analytically tractable and fully automated technique that alleviates the problems arising from empirical parameter tunings. This automated approach is applied to both the smoothing of the mixture component language model $P_{D_i}$ and the estimation of the mixture weights in the above component language model in (1). Additionally, described herein is the detailed mathematical derivation that shows how the smoothing parameters can be obtained by computing how an N-gram is predicted by (N−1)-gram. In particular, the OOV probability mass, which is equivalent to unigram discount, can therefore be estimated by inspecting how the unigram is predicted by the zero-gram. Methods to compute mixture coefficients are also described.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented information retrieval system 100 in accordance with the disclosed architecture. The system 100 includes a query component 102 that receives and processes a query 104 to retrieve a document 106 having different language styles as data streams 108. A model component 110 creates multiple language models 112 for the corresponding data streams 108. The language models 112 characterize the data streams 108 for document ranking. An estimation component 114 estimates mixture weights for the language models 112. The mixture weights 116 are computed as a measure of adaptability that the document 106 matches the language expressed in the query 104. The data streams 108 include multi-media streams for corresponding language styles of the document 106 and a query stream. The estimation component 114 is fully automatable for operation at index time.

Figure 2:
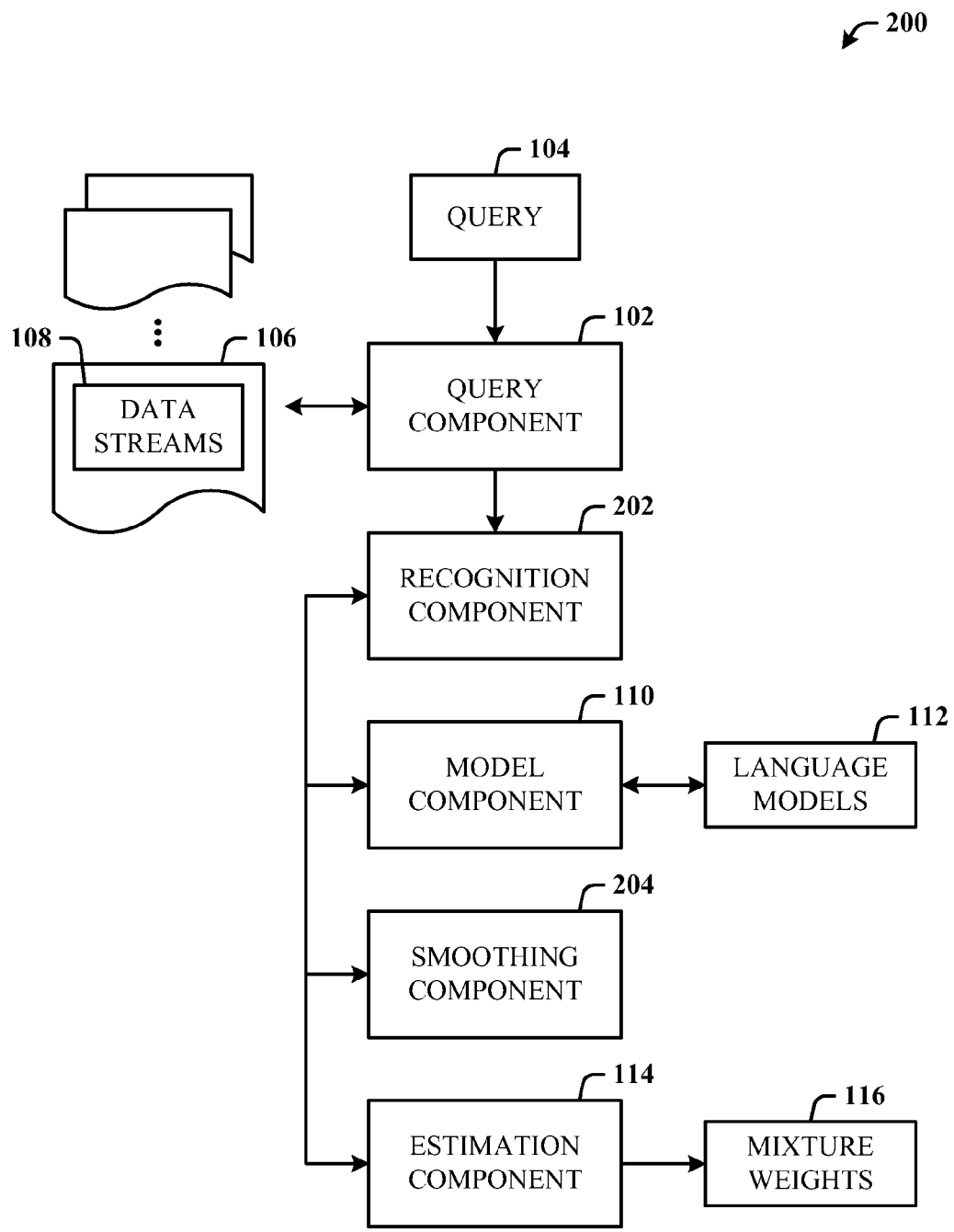
FIG. 2 illustrates an alternative embodiment of an information retrieval system.

FIG. 2 illustrates an alternative embodiment of an information retrieval system 200. The system 200 includes the components and entities of the system 100 of FIG. 1, as well as a recognition component 202 that recognizes the data streams for characterization by the language models 112 and a smoothing component 204 that applies smoothing to the language models 112 to generate similar cardinality among the language models 112 for linear combining. The smoothing component 204 applies class-based background language models so that each document language model has an equivalent number of mixture components. The smoothing component 204 employs language model adaptation by interpolation.

The probability of a document D that is served to the user with query Q, is P(Q|D)P(D). The likelihood function can be scaled using P(Q|D)P(D)=sum_c P(Q|D, C)P(D|C)P(C), where C represents a class of document. Organizing documents into classes will not lose information, yet the act of classifying has desirable properties from the perspective of engineering. For example, by approximation, P(Q|D, C)=P(Q|C), which implies evaluation of the query against a smaller number of classes, and only further evaluate documents within the promising classes at runtime. Additionally, it is often expected of the search engine to return results of enough diversity if there are multiple interpretations of a query. By classifying documents into classes the diversity issue can be more effectively controlled. A class-based language model as background is more specific and gives improved scores in implementation of the language model adaptation technique.

With respect to web language style analysis, the observation that the query language is different in styles from document body and may be closer to titles is intuitive. The language usages in the document text body, the title, the anchor text, as well as the queries against a commercial search engine for web documents provide the basic setting for this description. To quantify the language usages in these streams, a statistical N-gram language model is created for each stream and the complexity of the language studied using information theoretic measurements such as entropy or cross-entropy. Formally, the cross-entropy between model $P_A$ and $P_B$ is defined as, $$H(P_A \| P_B) = -\sum_t P_A(t) \log P_B(t)$$

Since the logarithmic function is convex, it can be shown that the cross-entropy is smallest when the two models are identical. The cross-entropy function can therefore be viewed as a measurement that quantifies how different the two models are. The entropy of a model $P_A$ is $H(P_A)=H(P_A\|P_A)$. To avoid the confusion on the base of the logarithm, the entropy is converted into the corresponding linear scale perplexity measurement, namely, $$PPL(P_A\|P_B) = e^{H(P_A\|P_B)}$$

It has been estimated in studies that the trigram perplexity of general English has an upper bound of two-hundred forty-seven words per position based on a one million word corpus of American English of varying topics and genres. In contrast, the web snapshot has a vocabulary size that is at least 1.2 billion for the document body, sixty million, one-hundred fifty million, and two-hundred fifty-two million for the title, anchor text and the user query streams, respectively. Of interest is to investigate how these language sources can be used to model user queries using the cross-entropy between the query language model and other models. It can be shown that the query language falls within the previously estimated upper bound for perplexity of two-hundred forty-seven for general English.

The cross-stream perplexities give hints on the efficacy of using various streams to model the query language. The document body has shown consistently the largest mismatch with the queries, while anchor text may be the best choice among the three to model the queries with powerful enough language models (i.e., N>1). Starting at bigram, both title and anchor text models have a smaller perplexity than the unigram model of query itself. The document title may be a more effective source than the body to build a language model for IR.

Up to trigram, the heightened modeling power with an increasing N uniformly improves the perplexities of all streams for queries, although this increased capability can also enhance the style mismatch that eventually leads to the perplexity increase at higher N. For the document body and title, the payoff of using more powerful language modes seems to taper off at bigram, whereas trigram may still be worthwhile for the anchor text.

The perplexity measure is not the ultimate metric for applications that model with lower perplexities do not necessarily lead to improved performance. However, the perplexity analysis is still informative in that higher perplexity models can seldom outperform the lower perplexity ones.

The disclosed architecture adopts a more analytically tractable approach to open-vocabulary discount than conventional approaches (e.g., Good-Turing formula) by employing the commonly known constantly adaptive language model (CALM) algorithm. The adaptation framework in CALM can be explained in an alternative manner using the widely known vector space paradigm. As the original CALM was developed for N-gram, the description applies to the unigram (N=1).

With respect to adaptation as vector interpolation, note that a language model can be thought of as a vector from an underlying functional space in which all the admissible language models for a given lexicon V form a simplex of the space, namely, $$\Lambda = \{P: V \to [0,1], \Sigma_{v \in V} P(v) = 1\}.$$

For example, any language model for a trivial binary lexicon can be represented by a point within the line segment enclosed by (1, 0) and (0, 1) on a two dimensional Euclidean space. Let $P_B$ denote the background language model and $P_O$ the statistics of a set of newly observed data to which to adapt the background language model. The goal of adaptation is to find a target $P_T \in \Lambda$, $P_T = P_B + \Delta P$, such that $P_T$ and $P_O$ are reasonably close, and $\Delta P$, the modification on the background language model, is minimized. Since the resultant model $P_T$ has to reside on the simplex, one cannot simply use the Euclidean norm to compute distances and determine the adapted language model without constraints.

However, it can be verified that such a constraint can be met by choosing the adjustment vector $\Delta P$ along the direction of the difference vector of $P_O - P_B$, namely, $\Delta P = \alpha_O(P_O - P_B)$, where $\alpha_O$ is the adaptation coefficient. It is desirable to pick a non-negative $\alpha_O$ so as to point the adjustment towards the right direction, and to choose $\alpha_O < 1$ so as to avoid overshoot. Accordingly, $$P_T = P_B + \alpha_O(P_O - P_B) = \alpha_O P_O + (1-\alpha_O) P_B \qquad (2)$$

LM adaptation can therefore be achieved by linear interpolation, assuming the same mathematical form as smoothing.

A contribution of CALM is to derive how the adaptation coefficient can be calculated mathematically when the underlying LM is based on N-gram assuming a multinomial distribution. The probability mass $1-\alpha_O$ can be interpreted as the prior probability of $P_B$ being the correct model and the closed form formulation of which can be obtained using Stirling's approximation. As described below, the adaptation coefficient for a given set of observations O can be computed as, $$\log(1 - \alpha_O) = \sum_{t \in O} \frac{n(t)}{L_O} \log \frac{P_B(t)}{n(t)/L_O} = -KL(P_O \| P_B) \quad (3)$$

where $L_O$ and $n(t)$ denote the document length and the term frequency of the term t, respectively. In short, the adaptation coefficient has a closed form relationship to the Kullback-Leibler (KL) divergence between the background model and the ML (maximum likelihood) estimation of the language model of the document $P_O(t)=n(t)/L_O$. It can be verified that, if $P_B(t)$ agrees with $n(t)/L_O$ for all terms—the adaptation coefficient $\alpha_O$ is zero. The more the background model disagrees with the observation, the more negative the right hand side of the above equation will become, which leads $\alpha_O$ to approach one.

With respect to the open vocabulary language model through N-gram discount, the CALM interpolation formula of (3) above indicates that in the target LM $P_T$, only $\alpha_O$ portion of the probability comes from the observation. In other words, the observation is "discounted" because a probability mass of $1-\alpha_O$ in the target language model is set aside for sources external to the observation. Formula (3) above can then be used to compute the discount factor of an N-gram by choosing the corresponding (N−1)-gram as the background. For N>1, (3) coincides with the formulation of the well-known Stolcke heuristics that has been widely used in the N-gram pruning: N-grams that can be reasonably predicted by (N−1)-gram can be pruned out of the model. That idea is extended down to N=1, where the observation $P_O$ and the background $P_B$ are the unigram and zero-gram language models, respectively. Conventionally, the zero-gram language model refers to the least informative language model that treats every token as OOV, namely, its probability mass is exclusively allocated for OOV. However, it is to be understood that other choices for the background model are also possible and viable. Given an observation with a vocabulary size$|V_O|$, a zero-gram language model equally distributes its probability mass among the vocabulary, $P_B(t)=1/|V_O|$, turning formula (3) above into, $$\log(1-\alpha_O) = \sum \frac{n(t)}{L_O} \log \frac{1/|V_O|}{n(t)/L_O} = H(P_O) - \log|V_O| \quad (4)$$

As above, $H(P_O)$ here denotes the (empirical) entropy of the observation LM $P_O$. Formula (4) can be further converted from the logarithmic into the linear scale and express the discount factor in terms of perplexity and vocabulary size:

$$pUnk=1-\alpha_O=PPL(P_O)/|V_O| \quad (5)$$

The interpretation of this outcome is intuitive. As well understood, perplexity is the expected number of alternatives when a language model is used to generate a token each time. The ratio of the perplexity to the vocabulary size characterizes how equivocal the language model is. The result of formula (5) above suggests that the higher the ratio, the less certain the language model is, and hence, the larger the discount should be. At the extreme case when the perplexity equals the vocabulary size, the language model is basically generating tokens in the random pattern as the zero-gram, and hence, the discount factor becomes one.

The disclosed architecture composes the smoothed stream component language model $P_{D_i}$ with (2) above, using an open-vocabulary language model trained from the stream collection as the background model. More specifically, for each document D and each stream i a closed-vocabulary maximum likelihood model is created as the observation $P_{O,D_i}$. The vocabulary for the stream $V_{O,C_i}$ and the closed-vocabulary stream collection model is thus obtained as, $$P_{O,C_i} = \sum_D P(D) P_{O,D_i}$$

The discount factor is computed with formula (3) and is used to attenuate the in-vocabulary probability as, $$P_{T,C_i}(t)=\alpha_{O,C_i}P_{O,C_i}(t), t \in V_{O,C_i}$$

The $P_{T,C_i}$ is the open-vocabulary stream collection model. Finally, the stream collection model is used as the background to obtain the smoothed document stream model through linear interpolation, $$P_{D_i}=\alpha_{D_i}P_{O,D_i}+(1-\alpha_{D_i})P_{T,C_i} \quad (6)$$

Here, the smoothing with the stream collection model ensures each document language model has the same number of mixture components even though the document does not have some stream observations. This smoothing alleviates the dilemma that some streams are sporadic and sparse for many web documents.

Although the interpolation coefficient $\alpha_{D_i}$ in (6) can, in practice, be kept as a free parameter to be empirically tuned, other alternatives that are tuning-free for the IR system can be obtained. For instance, the coefficient can be determined in a query-document dependent fashion at the query time where the coefficient for each document is chosen to maximize the query likelihood. Such a method effectively adapts the document language model to each query, and is practical when the individual score of how well a document matches the query is computed in a parallel computing environment.

Note that the interpolation coefficient in (6) can also be computed using (3) in a document dependent, yet query independent, fashion. Several observations can be made from this approach. First, the adaptation coefficient of (3) is document dependent as desired. CALM achieves the document dependent estimation of $\alpha_{D_i}$ without having to make a strong assumption that the family of the prior distribution is conjugate to the multinomial distribution. The estimation is fully automatable in that it does not utilize a free parameter that can vary and has to be empirically determined from application to application. CALM can therefore be implemented at the index time not only in a batch mode but also in an online fashion that model adaptation takes place as soon as the document enters the collection (e.g., crawled from the web). Secondly, since CALM uses a linear interpolation method. Third, the computation of (3) is light weight. Its complexity grows only linearly with the unique terms in the observation.

With respect to a mixture language model, the mixture weights for the component language models play a role in the multi-style language model approach. The CALM adaptation formula can be applied to compute the weights of the multi-component mixture (1) by first re-arranging the distribution as a two-component mixture:

$$P_D = w_0 P_{D_0} + (1-w_0) \sum_{i>0} w'_i P_{D_i} \quad (7)$$

As (3) can be applied to obtain $w_O$, the process can be recursively repeated to obtain other coefficients. Since a goal of the document language model is to evaluate queries, it is desirable that the model be close to the query language. Accordingly, it is appropriate to choose the query stream as $D_O$ in formula (7) so that the CALM formula functions as adapting other mixture components to the query. This method leads to document-dependent mixture weights, leaves no parameter to tune, and is enticing in terms of engineering web-scale IR because the mixture coefficients can be pre-computed when the documents are being indexed.

The query dependent portion of the ranking function is the query likelihood $P_D(Q)$ in formula (I). The objective of choosing the optimal mixture weights is to maximize this likelihood. As shown in (6), each mixture component itself is a two-component mixture that has parameters to be determined. The re-estimation formula under an expectation maximization (EM) algorithm can be obtained as, $$\hat{w}_i = \frac{1}{|Q|} \sum_{q \in Q} \left( w_i P_{D_i}(q) \Big/ \sum_i w_i P_{D_i}(q) \right) \quad (8)$$

and, $$\hat{\alpha}_{D_i} = \frac{1}{|Q|} \sum_{q \in Q} \frac{\alpha_{D_i} P_{O,D_i}(q)}{P_{D_i}(q)} \quad (9)$$

The linear interpolation of (2) indicates the adapted distribution $P_T$ is a mixture of the ML estimation of the observation data $P_O$ and the background model $P_B$. Note that the probability of an event E is the mixture sum of the event taking place under various conditions $C_i$ weighted by the respective priors $P(C_i)$:

$$P(E) = \sum_i P(E \mid C_i) P(C_i)$$

The document language model is described as the following: given a query Q, a minimum risk retrieval system ranks the document D based on product of the likelihood of the query under the document language model, $P_D(Q)$, and the prior of the document $P(D)$:

$$s(D,Q) = P_D(Q) P(D)$$

The mixture coefficient from above can be viewed as the prior probability of the respective mixture component being the "real" distribution in describing the probabilistic events whose statistical property is characterized by $P_T$. In the case of adaptation, the probability of the background being the real distribution can be estimated by computing how effective the background model predicts the observation, where token t occurs n(t) times among a total of $L_O$ tokens, namely, $$L_O = \Sigma_{t \in O} n(t)$$

With the assumption that the background model $P_B$ is a multinomial distribution, the probability of the observation evaluated against $P_B$ is $$P_B(O) = \frac{L_O!}{\prod_{t \in O} n(t)!} \prod_{t \in O} P_B(t)^{n(t)}$$

Equivalently, $$\log P_B(O) = \log L_O! - \sum_{t \in O} \log n(t)! + \sum_{t \in O} n(t) \log P_B(t)$$

The factorial terms in the above equation can be approximated by the well-known Stirling formula as, $$\log n! \approx n \log n - n$$

Accordingly, $$\log P_B(O) \approx L_O \log L_O - L_O - \sum_{t \in O} [n(t) \log n(t) - n(t)] + \sum_{t \in O} n(t) \log P_B(t)$$

$$= L_O \log L_O + \sum_{t \in O} n(t) \log \frac{P_B(t)}{n(t)}$$

$$= \sum_{t \in O} n(t) \log \frac{P_B(t)}{n(t)/L_O}$$

Note that the mixture weight is the per-token probability, whereas $P_B(O)$ above is evaluated over a total of $L_O$ tokens. With the statistical independent assumptions of the tokens in the language model, $$\log P_B(O) = \log(1-\alpha_O)^{L_O} = L_O \log(1-\alpha_O)$$

which leads to (3).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
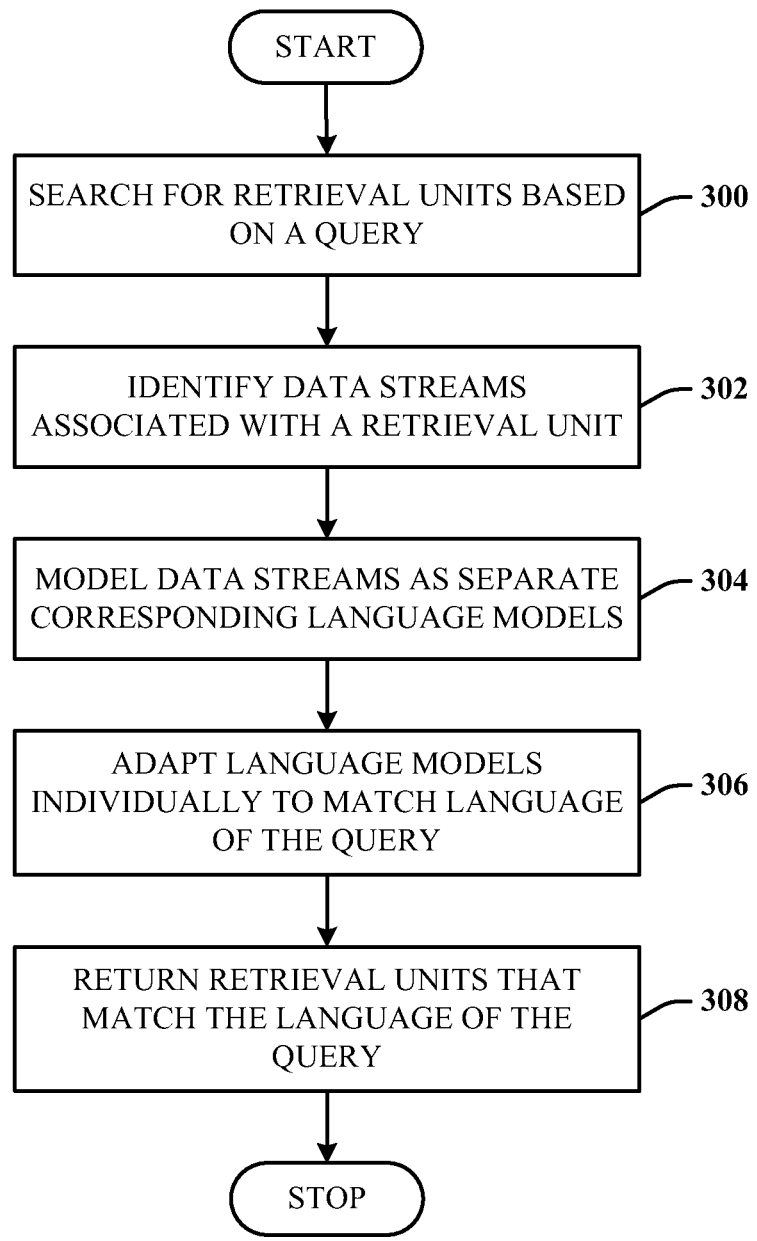
FIG. 3 illustrates a computer-implemented information retrieval method in accordance with the disclosed architecture.

FIG. 3 illustrates a computer-implemented information retrieval method in accordance with the disclosed architecture. At 300, retrieval units are searched based on a query. At 302, data streams associated with a retrieval unit are identified. At 304, the data streams are modeled as separate corresponding language models. At 306, the language models are adapted individually to match language of the query. At 308, retrieval units are returned that match the language of the query.

Figure 4:
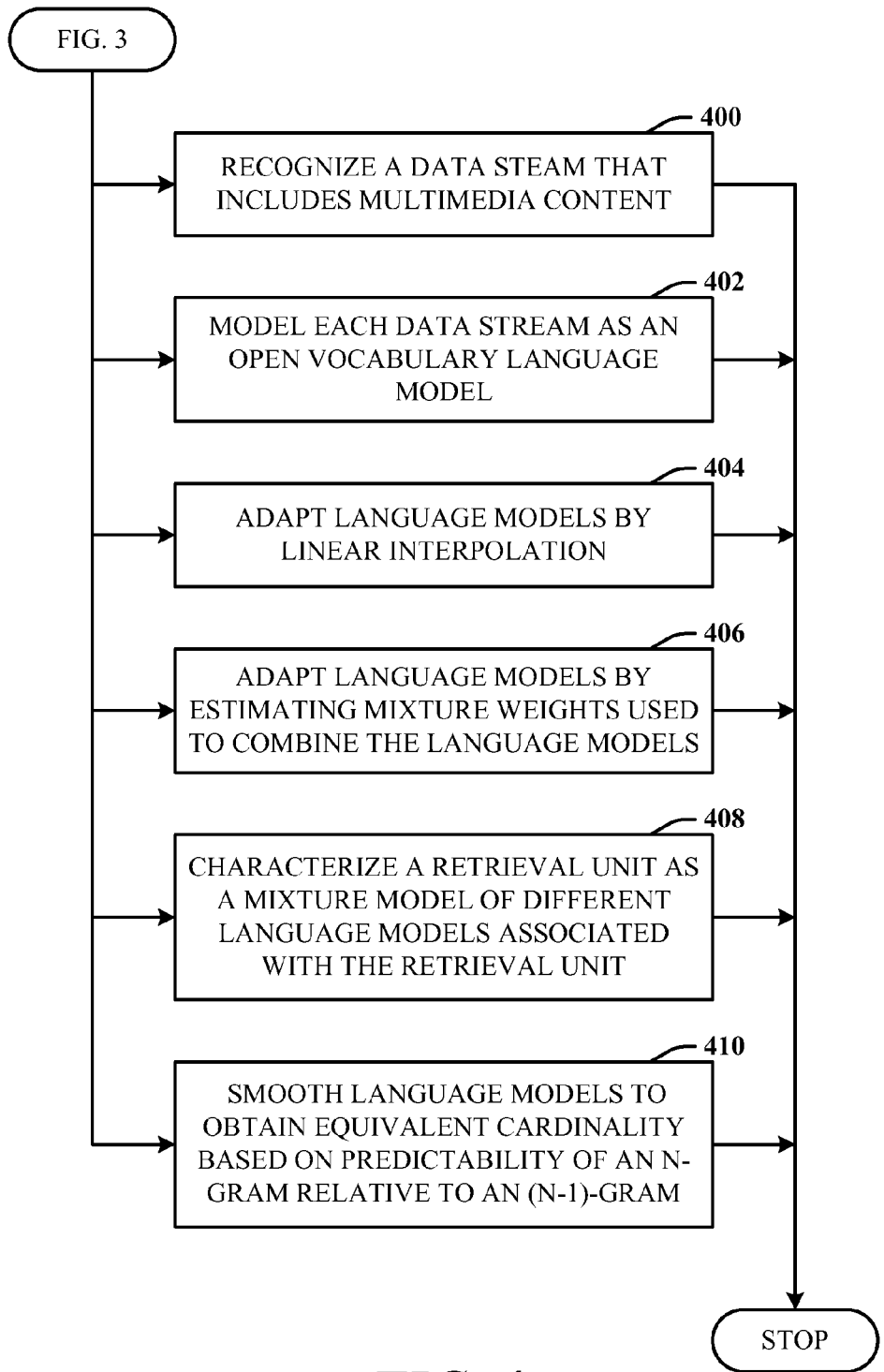
FIG. 4 illustrates further aspects of the method of FIG. 3.

FIG. 4 illustrates further aspects of the method of FIG. 3. At 400, a data steam that includes multimedia content is recognized. At 402, each data stream is modeled as an open vocabulary language model. At 404, the language models are adapted by linear interpolation. At 406, the language models are adapted by estimating mixture weights used to combine the language models. At 408, a retrieval unit is characterized as a mixture model of different language models associated with the retrieval unit. At 410, the language models are smoothed to obtain equivalent cardinality based on predictability of an N-gram relative to an (N−1)-gram.

Figure 5:
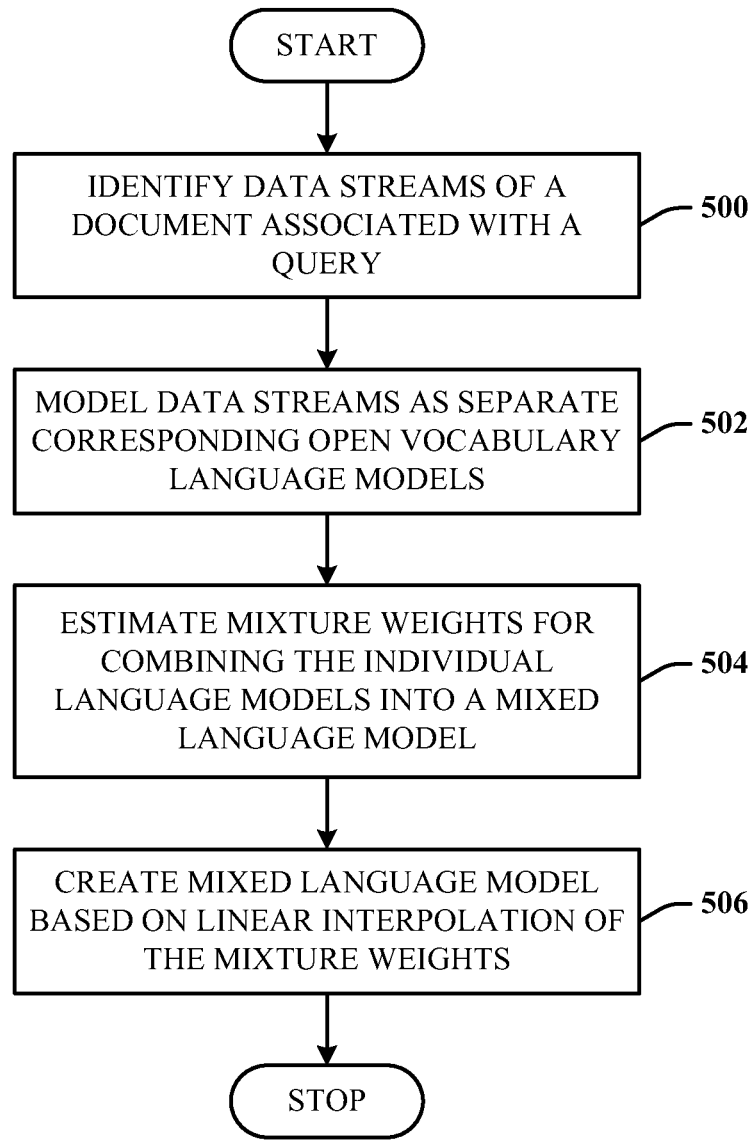
FIG. 5 illustrates an alternative information retrieval method.

FIG. 5 illustrates an alternative information retrieval method. At 500, data streams of a document associated with a query are identified. At 502, the data streams are modeled as separate corresponding open vocabulary language models. At 504, mixture weights are estimated for combining the individual language models into a mixed language model. At 506, the mixed language model is created based on linear interpolation of the mixture weights.

Figure 6:
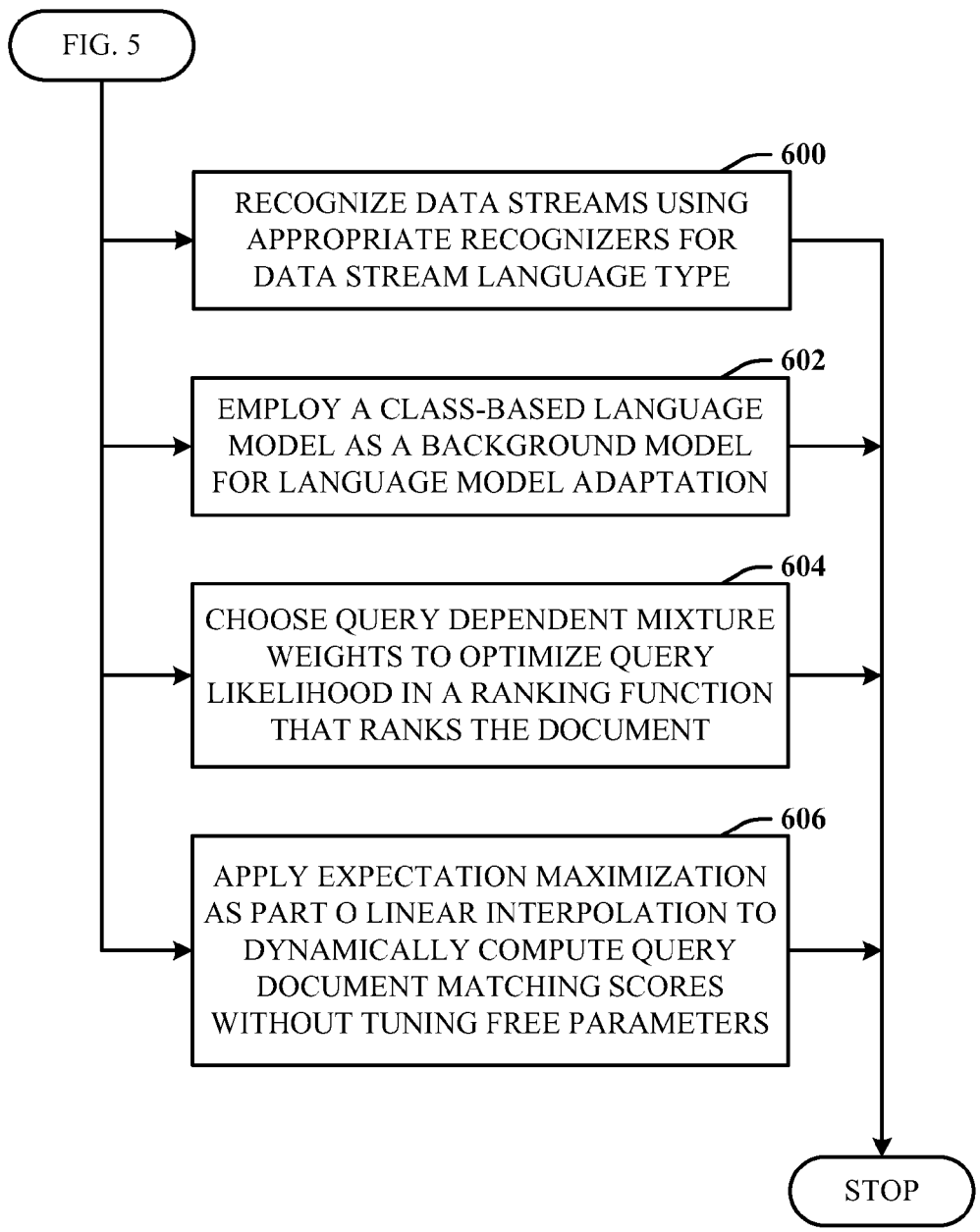
FIG. 6 illustrates further aspects of the method of FIG. 5.

FIG. 6 illustrates further aspects of the method of FIG. 5. At 600, the data streams are recognized using appropriate recognizers for data stream language type. At 602, a class-based language model is employed as a background model for language model adaptation. At 604, query dependent mixture weights are chosen to optimize query likelihood in a ranking function that ranks the document. At 606, expectation maximization is applied as part of linear interpolation to dynamically compute query document matching scores without tuning free parameters.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
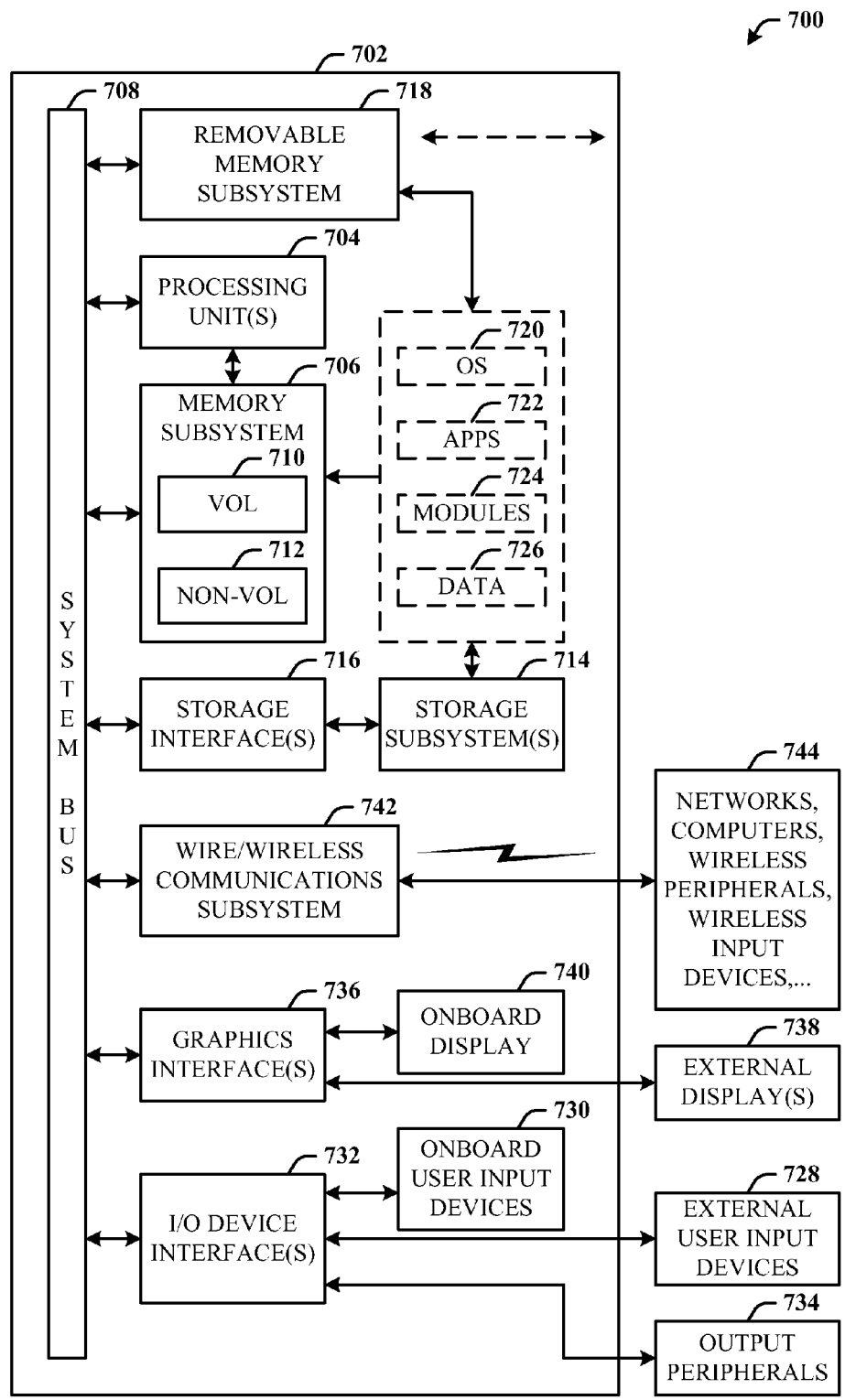
FIG. 7 illustrates a block diagram of a computing system that executes information retrieval using adaptive language models in accordance with the disclosed architecture.

Referring now to FIG. 7, there is illustrated a block diagram of a computing system 700 that executes information retrieval using adaptive language models in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include non-transitory media such as one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of the system 100 of FIG. 1, the entities and components of the system 200 of FIG. 2, and the methods represented by the flowcharts of FIGS. 3-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. The instructions can exist on non-transitory media. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented information retrieval system comprising:
    a query component configured to receive and process a query to retrieve a document having different language styles as data streams, the data streams including at least a first stream for a first portion of the document and a second stream for a second portion of the document, wherein the second stream is different from the first stream and the second portion is different from the first portion;
    a model component configured to create multiple language models for the data streams of the document, the multiple language models characterizing the data streams for document ranking, the multiple language models comprising at least a first language model for the first portion of the document and a second language model for the second portion of the document, wherein the second language model is different from the first language model;
    an estimation component configured to estimate mixture weights for the multiple language models;
    a smoothing component configured to apply smoothing to the multiple language models to generate similar cardinality among the multiple language models for linearly combining scores output by the multiple language models; and
    a processor configured to execute the query component, the model component, the estimation component, and the smoothing component.

2. The system of claim 1, wherein the mixture weights are computed as a measure of adaptability that the document matches language expressed in the query.

3. The system of claim 1, wherein the data streams include multi-media streams for corresponding language styles of the document and a query stream.

4. The system of claim 1, further comprising a recognition component configured to recognize the data streams for characterization by the multiple language models.

5. The system of claim 1, wherein the smoothing component is configured to apply class-based background language modeling so that each of the multiple language models has an equivalent number of mixture components.

6. The system of claim 1, wherein the smoothing component is configured to employ language model adaptation by linear interpolation or log-linear interpolation.

7. The system of claim 1, wherein the estimation component is fully automatable for operation at index time independent of using additional tuning data.

8. One or more hardware computer-readable memory devices or hardware storage devices comprising executable instructions which, when executed by one or more processors, cause the one or more processors to perform acts comprising:
   identifying data streams in different portions of a document associated with a query, the data streams including at least a first data stream obtained from a first portion of the document and a second data stream that is different from the first data stream, the second data stream being obtained from a second portion of the document other than the first portion;
   modeling the data streams as separate language models corresponding to the different portions of the document, the separate language models including at least:
      a first language model of the first data stream obtained from the first portion of the document, the first language model reflecting first language usage in the first portion of the document, and
      a second language model, different from the first language model, of the second data stream obtained from the second portion of the document, the second language model reflecting second language usage in the second portion of the document that is different from the first language usage in the first portion of the document;
   estimating mixture weights for combining the separate language models into a mixed language model; and
   creating the mixed language model by interpolating the mixture weights.

9. The one or more hardware computer-readable memory devices or hardware storage devices of claim 8, the acts further comprising recognizing the data streams using appropriate recognizers for data stream language type.

10. The one or more hardware computer-readable memory devices or hardware storage devices of claim 8, the acts further comprising choosing query dependent mixture weights to optimize query likelihood in a ranking function that ranks the document.

11. The system of claim 1, wherein the first portion of the document includes anchor text and the first language model characterizes the anchor text of the document for the document ranking, and the second language model does not characterize the anchor text of the document for the document ranking.

12. The system of claim 11, wherein the second portion of the document includes a title of the document and the second language model characterizes the title of the document for the document ranking, and the first language model does not characterize the title of the document for the document ranking.

13. The one or more hardware computer-readable memory devices or hardware storage devices of claim 8, wherein the first language model and the second language model are open vocabulary language models.

14. A system comprising:
   one or more processors; and
   computer-executable instructions that, when executed by the one or more processors, configure the one or more processors to:
      identify data streams in different portions of a document, the data streams including at least a first data stream obtained from a first portion of the document and a second data stream that is different from the first data stream, the second data stream being obtained from a second portion of the document other than the first portion;
      model the data streams as separate language models corresponding to the different portions of the document, the separate language models including at least:
         a first language model of the first data stream obtained from the first portion of the document, the first language model reflecting first language usage in the first portion of the document, and
         a second language model of the second data stream obtained from the second portion of the document, wherein the second language model is different than the first language model and reflects second language usage in the second portion of the document that is different from the first language usage in the first portion of the document; and
      use the separate language models to estimate a probability that the document matches a query by:
         adapting the separate language models individually to match the query, and
         characterizing the document as a mixture model that combines the separate language models.

15. The system of claim 14, wherein the computer-executable instructions further configure the one or more processors to:
   identify other data streams in other portions of other documents and model the other data streams;
   estimate other probabilities that the other documents match the query; and
   rank the document relative to the other documents based on the probability and the other probabilities.

16. The system of claim 14, wherein the first data stream is a text stream and the second data stream is an audio stream, a video stream, or an image stream.

17. The system of claim 14, wherein the computer-executable instructions further configure the one or more processors to:
   smooth the separate language models with a shared background model using a common vocabulary.

18. The system of claim 17, wherein the shared background model employs an open-vocabulary language model having at least some out-of-vocabulary terms with respect to at least one of the separate language models.

19. The system of claim 14, wherein the computer-executable instructions further configure the one or more processors to estimate the probability using a prior of the document.

20. The system of claim 14, wherein the adapting is performed by interpolation.

* * * * *